United States Patent
Sinz et al.

(10) Patent No.: US 11,473,657 B2
(45) Date of Patent: Oct. 18, 2022

(54) BALL SCREW, SPINDLE NUT AND METHOD FOR PRODUCING A SPINDLE NUT

(71) Applicant: SFS intec Holding AG, Heerbrugg (CH)

(72) Inventors: Daniel Sinz, Kennelbach (AT); Stefan Frei, Chur (CH)

(73) Assignee: SFS intec Holding AG, Heerbrugg (CH)

( * ) Notice: Subject to any disclaimer, the term of this patent is extended or adjusted under 35 U.S.C. 154(b) by 0 days.

(21) Appl. No.: 17/212,134

(22) Filed: Mar. 25, 2021

(65) Prior Publication Data

US 2021/0301911 A1  Sep. 30, 2021

(30) Foreign Application Priority Data

Mar. 25, 2020 (EP) ..................................... 20165654

(51) Int. Cl.
*F16H 25/22* (2006.01)
*B21D 28/32* (2006.01)
*F16H 25/24* (2006.01)

(52) U.S. Cl.
CPC ......... *F16H 25/2223* (2013.01); *B21D 28/32* (2013.01); *F16H 2025/2481* (2013.01)

(58) Field of Classification Search
CPC ......... F16H 2025/2481; F16H 25/2214; F16H 25/2219; F16H 25/2223; F16H 25/2204; F16H 25/22
See application file for complete search history.

(56) References Cited

U.S. PATENT DOCUMENTS

| | | | | |
|---|---|---|---|---|
| 2,855,792 | A * | 10/1958 | Gates | F16H 25/2214 74/424.87 |
| 6,116,109 | A * | 9/2000 | Zernickel | F16H 25/2214 74/424.9 |
| 9,897,181 | B1 * | 2/2018 | Lin | F16H 25/2214 |
| 2005/0257636 | A1 | 11/2005 | Osterlanger et al. | |

(Continued)

FOREIGN PATENT DOCUMENTS

| | | | | |
|---|---|---|---|---|
| DE | 102012213856 A1 * | 11/2013 | ......... | F16H 25/2214 |
| DE | 102013210558 | 12/2014 | | |

(Continued)

*Primary Examiner* — Daniel D Yabut
(74) *Attorney, Agent, or Firm* — Volpe Koenig

(57) ABSTRACT

A method for producing a spindle nut (10) for a ball screw (12) is provided, having the following steps: providing a substantially cylindrical workpiece (50) with first and second end faces (46, 44) and a lateral surface (14), shaping the workpiece (50) by pressing in an axially symmetrical central opening (16) and by simultaneously pressing in at least one first (18) and one second (20) channel which are arranged axially in parallel in the lateral surface (14) of the workpiece (50), the central opening (16) and the channels (18, 20) being open toward the first end face (46), introducing an internal thread (34) into the central opening (16), and introducing at least two radially running through-openings (22, 24) at least into the first channel in the form of a transfer channel for receiving diverting inserts (26, 28). A spindle nut (10) produced by the method and to a ball screw (12) having such a spindle nut (10) are also provided.

14 Claims, 4 Drawing Sheets

(56) References Cited

U.S. PATENT DOCUMENTS

| | | | |
|---|---|---|---|
| 2010/0101348 A1* | 4/2010 | Teramachi | F16H 25/2223 |
| | | | 74/424.81 |
| 2010/0132494 A1 | 6/2010 | Sugita | |
| 2013/0199324 A1* | 8/2013 | Piltz | F16H 25/2223 |
| | | | 74/424.86 |
| 2013/0298710 A1* | 11/2013 | Kreutzer | F16H 25/2214 |
| | | | 74/424.86 |
| 2015/0284020 A1* | 10/2015 | Asakura | B62D 5/0448 |
| | | | 180/444 |

FOREIGN PATENT DOCUMENTS

| | | | | |
|---|---|---|---|---|
| EP | 2515000 A1 * | 10/2012 | | F16H 25/2214 |
| EP | 3557096 A1 * | 10/2019 | | B62D 5/0448 |
| WO | 2004027286 | 4/2004 | | |
| WO | 2008129692 | 10/2008 | | |
| WO | WO-2013112597 A1 * | 8/2013 | | F16H 25/2214 |

\* cited by examiner

BALL SCREW, SPINDLE NUT AND METHOD FOR PRODUCING A SPINDLE NUT

INCORPORATION BY REFERENCE

The following documents are incorporated herein by reference as if fully set forth: European Patent Application No. EP20165654.3, filed Mar. 25, 2020.

TECHNICAL FIELD

The present invention relates to a ball screw, a spindle nut and a method for producing a spindle nut.

A rolling-ring screw with balls as rolling bodies is usually referred to as a recirculating ball screw or else a ball screw. Included among the main constituent parts of a ball screw are a threaded spindle and a spindle nut which engages around this spindle. During operation, balls circulate between these two components. The thread flights of the threaded spindle as well as of the spindle nut are in the form of ball grooves with a suitable profile and are matched in a complementary manner to one another such that together they form a ball channel or a ball guide in the assembled state. By contrast to a screw/nut connection, in which the thread flanks slide on one another in a planar manner, in the case of the ball screw the recirculating balls in the thread take up the transmission of load between nut and spindle. The planar sliding movement is thus replaced by a rolling movement, this being associated with reduced friction.

In order to obtain a closed recirculation path for the balls, ball diverters are used. Said ball diverters have the task of lifting the balls out of the ball guide between spindle nut and threaded spindle at a first location and feeding them back at a second location. The ball return thus constitutes a bypass, which bridges one or more thread flights of the nut/spindle system and thus completes a closed recirculation path for the balls of a ball screw. In general, the balls in the spindle nut are lifted radially outwardly out of the ball groove and guided inside or outside the spindle nut in a channel or a tube, before they are inserted again in the ball channel between threaded spindle and spindle nut at the location provided for this purpose.

From a technical perspective, a ball screw operates as a screw drive, which can convert a rotational movement into a longitudinal movement, or vice versa, the step-down or step-up ratio being determined by the dimensioning of the threaded spindle and the pitch of the thread. Ball screws can fundamentally be operated in two modes. If the spindle nut is mounted in a positionally fixed but rotatable manner, the threaded spindle however being mounted in a rotationally fixed but longitudinally displaceable manner, the threaded spindle moves along its longitudinal axis as soon as the nut is driven. In the second case, the threaded spindle is mounted in a positionally fixed but rotatable manner, and the spindle nut is mounted in a rotationally fixed and longitudinally movable manner. In the case of a driven threaded spindle, this leads to a linear movement of the spindle nut along the threaded spindle.

Ball screws are used in many technical applications, primarily in mechanical engineering and there preferably in machine tools. Ball screws are increasingly however also being used as longitudinal drives in sectors where previously hydraulic or pneumatic systems were used, e.g. in presses, injection molding machines and power steering systems. Moreover, ball screws also play an increasing role in electromechanical and electrohydraulic braking systems, where ball screws are used as a replacement for hydraulic brake cylinders or parallel to known braking systems in the case of braking assistance systems. There, driven by electric motors, they help to increase the braking force of a driver or, as part of a safety system, they help to introduce or to assist a (emergency) braking operation. Purely electrically operated braking systems with ball screws as brake cylinder replacements on each wheel are thus also possible.

The design of a spindle nut is to be considered in more detail below. The spindle nut fundamentally comprises a hollow-cylindrical base body having an axial internal thread, which is in the form of a top shell of the ball recirculation groove. This base body can be produced completely as a turned/milled part, which is very time-consuming. For some time, the spindle nuts have therefore been produced largely as pressed parts from wire portions, which have to be reworked by turning or milling only at a few points for reasons of dimensional accuracy. The additional operations relate (in addition to the internal threads) primarily to the ball diverters, which in the prior art are configured frequently as longitudinal bores concealed in the wall of the spindle nut, parallel to the longitudinal axis of said bores. These longitudinal bores are usually configured over the entire length as passage bores, because in this way they only have to be cleaned and moreover the ball diverter can be attached directly to the end face of the spindle nut. This ball channel can be bored open or milled open radially from the outside inward at defined locations where the balls are to be removed or returned from the recirculation channel between spindle nut and threaded spindle. The removal or return is realized in this case in a known manner by insert elements (inserts), which are manufactured from metal, plastic or a combination of such elements. The complex geometry of these inserts or ball diverter elements can be reproduced more easily as an injection molded part or sheet-metal shaped part than as geometries to be milled in the wall of the spindle nut.

It is conventionally the case that a considerable outlay of additional operations on the manufacture of the actual ball guide channel between the removal and return locations is omitted. Said ball guide channel is usually bored as a channel or milled as a slotted groove. In the latter configuration, the channel has to be covered after assembling the ball screw and filling it with balls. This can be effected by a collar which is pushed on or is to be pressed on, or else by a bracket to be provided in any case at this location, a flanged mounting or a sleeve.

In this respect, ball screws are comparatively complex structural elements which are laborious to produce and mass manufacture with justifiable costs requires new approaches.

SUMMARY

The invention is based on the object of specifying a method for producing a spindle nut which is simplified in comparison with the prior art and therefore saves costs. The spindle nuts produced by the method and thus also the ball screw containing these spindle nuts should be precisely manufactured, reliable and have a long service life under any kind of loads.

This object is achieved by a method having one or more of the features described herein. Advantageous configurations of the invention are specified in the description and claims that follow.

The invention relates to a method for producing a metallic spindle nut for a ball screw, having the following steps:

providing a substantially cylindrical workpiece from metal, with a first end face and a second end face and also a lateral surface, shaping the workpiece by pressing in an axially symmetrical central opening and by simultaneously pressing in at least one first and one second channel which are oriented axially in parallel into the lateral surface of the workpiece, the central opening and the channels being open toward the first end face, and introducing an internal thread into the central opening, and forming at least the first channel as a transfer channel by introducing at least two radially running through-openings into said channel for the purpose of receiving diverting inserts.

In particular, the channels are thus not milled, but rather pressed into the lateral surface of the workpiece. This pressing in is performed at the same time as the shaping of the rest of the base shape of the spindle nut. If, for instance, the central opening were to be shaped first of all, in order then to form in the channels, the form of the central opening would be destroyed again by the second forming step. This also applies in reverse, if firstly the channels and only then the central opening are formed in, then the forming in of the central opening would leave the channels unchanged. The channels run axially in parallel, this being a consequence of the axial advancing of the shaping tool. Since furthermore the channels are pressed in from an end face, they are open toward this end face. The term "channel" is to be understood here essentially verbatim such that the channel is formed by being pressed in into the lateral surface as troughs, grooves or slots, which are present so as to be radially outwardly open (as viewed from the longitudinal central axis of the workpiece).

To ensure a compensating material displacement, it is always the case that two channels are pressed in. The angular arrangement of the channels in the lateral surface is preferably mirrored on the central longitudinal axis of the workpiece, they are thus offset by 180 degrees with respect to the cylinder symmetry of the workpiece. In this way, what is obtained is the additional advantage that unbalances owing to the symmetry with respect to the longitudinal axis when the nut is rotating are minimized. In this way, an intermediate product for a spindle nut is thus manufactured from a cylindrical workpiece of solid material, said intermediate product being able to be finished by an in particular material-removing aftertreatment.

The arrangement of the channels in the lateral surface that is offset by 180° can also be deviated from, for example when the nut is installed rigidly during use and thus unbalances during rotation do not play a role. Investigations have shown that an angular arrangement with an offset of between 100° and 180° on the circumference can be realized from a technical perspective, values of around 120° and 180° being preferred.

Furthermore, it is possible as an alternative, when only the first channel is to be formed as a transfer channel and the second channel therefore does not have to be available as a transfer channel, to produce said second channel with a simplified cross section. This can e.g. mean that the channel is designed with a flat slope and with a flatter slope, thereby allowing an improved service life of the pressing tool. To obtain the above-described effect of symmetrical material displacement, it is important that the pressing-in depth in the longitudinal direction and the volume of shaped material of the second channel also substantially corresponds to that of the first channel.

It would be conceivable e.g. that the first channel as a transfer channel is produced in cross section as a rounded U-shaped cross-sectional profile, while the second channel is realized as a simple V-shaped cross-sectional profile. The considerations set out above in relation to the material displacement retain their validity, and therefore also the challenge that the shaping has to be comparable in terms of the volume (within +/−10% to 15%, depending on the geometry of the spindle nut).

The method step "introducing an internal thread into the central opening" can be achieved by an (internal thread) shaping operation, by thread milling or a combination of the two. In this respect, usually first of all the thread is pre-shaped by cutting and then finished by a shaping step. This has the advantage that the resulting surfaces have greater surface hardness due to the compaction during the shaping operation. A final grinding operation for optimization purposes is possible, but not necessary.

The method defined here is not only particularly simple and cost-effective in comparison with methods of the prior art, it also supplies a precisely manufactured product with a long service life. In the case of shaping, in contrast to manufacturing methods in which material is removed, the cohesion of the substance is largely maintained. The plastic changes in shape of the workpiece are effected by virtue of flowing on crystallographically preferred slip planes. The metallic regions between these slip planes remain practically unchanged, with the result that no macroscopic changes in the material composition are to be expected as a result of the shaping operation. The material quality is thus predetermined practically completely by the starting workpiece. With a suitable procedure, no singularities, which could lead to failures during use of the workpiece, arise in the workpiece, as a result of which a long service life can be expected. The method described, which substantially involves a shaping operation, is thus a simple and cost-effective method. The cost saving is based substantially on the fact that time-consuming and tool-intensive material-removing method steps of a conventional manufacture are avoided and that the shaping operation takes place without loss of material. The method also provides a spindle nut which is suitable for satisfying high requirements.

It is expediently provided that the pressing in of the channels ends before reaching the second end face, with the result that the channels are closed toward the second end face. It is, of course, also entirely possible to press the transfer channels through as far as the second end face. However, in this case, fraying of the second end face can occur, with the result that reworking is necessary. This can advantageously be avoided in that the pressing in ends before reaching the second end face.

The method is refined in that the through-openings are milled and/or bored. In terms of the through-openings, a material-removing method is thus preferably used. This can, however, also take place without great outlay, since the milling and/or boring of the simply constructed through-openings is a known task.

It can furthermore be provided that the central opening is pressed in through to the second end face. The pressing-in operation of the central opening thus already results in a hollow cylinder which is open on both sides. As has already been mentioned in conjunction with a pressing in of the transfer channels through to the second end face, it is possible in this way however that a reworking is necessary, since the pressing through all the way to the second end face can create unsmooth material boundaries.

Therefore, it may also be expedient that the pressing in of the central opening ends before reaching the second end face and that the second end face is removed by material removal after the pressing in operation, with the result that the central opening is open toward a new second end face which is produced thereby. In this way, a creation of unsmooth material boundaries is avoided. Since, an aftertreatment by material removal can scarcely be avoided even during a pressing through of the central opening, it is also possible to immediately proceed in such a way that the pressing through is not performed at all through to the second end face.

It can also be provided that the first end face is removed by material removal after the shaping operation, with the result that a new first end face is produced. The two end faces of the spindle nut can thus be post-treated by material removal, in order thus in particular to bring them to size.

This is performed expediently advantageously in that the removal of the end faces by material removal is performed by turning.

It is furthermore provided that an internal thread is introduced into the central opening after the shaping operation. A milling operation with subsequent shaping is the means of choice for introducing a thread into the spindle nut.

It can furthermore be provided that axially parallel flattened portions are formed into the lateral surface during the shaping of the workpiece. These flattened portions serve in particular to center the workpiece during the aftertreatment by material removal.

The invention furthermore includes a spindle nut for a ball screw that in particular can be obtained by the method described above, the spindle nut having in its lateral surface at least one first and one second axially parallel channel, which channels are open toward an end face of the spindle nut.

The invention furthermore relates to a ball screw having a spindle nut of this type, a spindle, a multiplicity of balls, at least two diverting inserts in each transfer channel, and at least one transfer channel covering.

BRIEF DESCRIPTION OF THE DRAWINGS

The invention will now be explained by way of example with reference to the appended drawings on the basis of particularly preferred embodiments.

DETAILED DESCRIPTION

Figure 1:
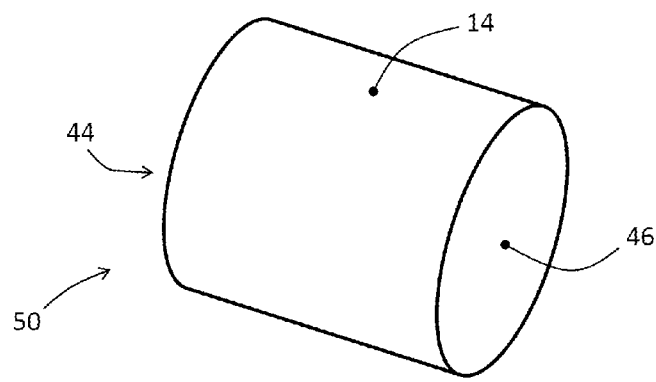
FIG. 1 shows a perspective illustration of a workpiece.

FIG. 1 shows a perspective illustration of a workpiece 50. The workpiece 50, from which the method according to the invention for producing a spindle nut proceeds, is cylindrical and consists of solid material, in particular a metal or a metal alloy. It is not at all necessary that the workpiece is selected as cylindrical, since during the subsequent shaping operation a spindle nut can also be formed from non-cylindrical workpieces. However, the cylindrical shape of the workpiece is that which is selected almost exclusively, since the workpiece 50 is in most cases simply a piece of a wire. It is also not necessary that the workpiece 50 consists of solid material. The workpiece can have, for example, a central bore in order to reduce the amount of material which is to be displaced in the subsequent shaping operation. The workpiece 50 has a lateral surface 14, a first end face 46 and a second end face 44.

Figure 2:
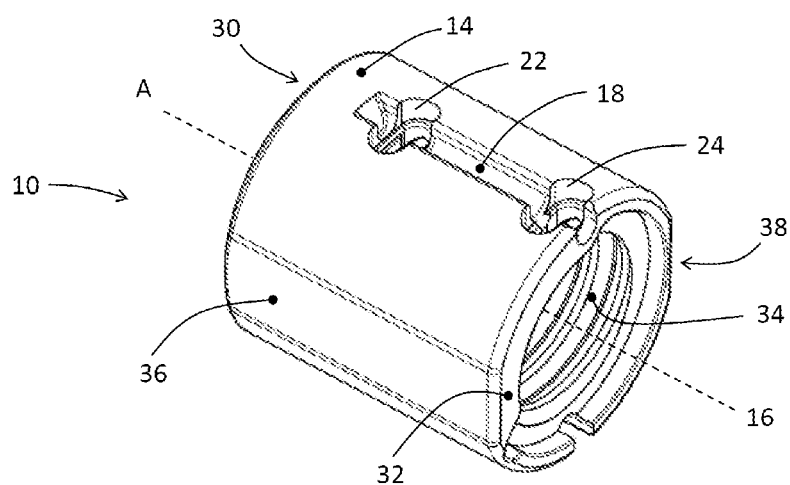
FIG. 2 shows a perspective illustration of a spindle nut according to the invention.

FIG. 2 shows a perspective illustration of a spindle nut 10 according to the invention. The spindle nut 10 has a lateral surface 14 and two end faces 30, 32. Furthermore, pressed into the lateral surface 14 are two channels 18, 20 which are oppositely situated, that is to say offset by 180 degrees, the first channel 18 being in the form of a transfer channel. The two channels are open toward the first end face 32. Radially running through-openings 22, 24 are provided in the first channel 18. The central opening 16 pressed in into the spindle nut 10 is equipped with an internal thread 34. The lateral surface 14 of the spindle nut 10 is provided with flattened portions 36, 38.

Proceeding from the workpiece 50 as per FIG. 1, the spindle nut 10 as per FIG. 2 is manufactured in that firstly, the central opening 16 and the transfer channels 18, 20 are pressed in at the same time. The central opening 16 is pressed through in this case, with the result that it is open toward both end faces 44, 46 of the workpiece 50. The transfer channels 18, 20 are not pressed through toward the second end face 44, with the result that they are only open toward the first end face 46. The flattened portions 36, 38 are also created during the shaping operation. After the shaping, a plurality of material-removing method steps are performed. These steps can take place in various orders. In particular, radially running through-openings 32, 34 are milled and/or bored into the transfer channels 18, 20. The end faces 44, 46 are smoothed by a turning operation and turned to size to form the end faces 30, 32 of the spindle nut 10. The internal thread 34 is milled. The fact that the end face 44, through to which the central opening 16 is pressed through, is subjected to a turning operation can scarcely be avoided, since during the passage of the shaping tool through the central opening 16, an unsmooth edge is created as it were inevitably. Rather, the turning to size of the first end face 46 can be dispensed with, it also being possible here however for unsmooth areas to be present as a result of the repositioning of the shaping tool that are eliminated expediently by turning.

Figure 3:
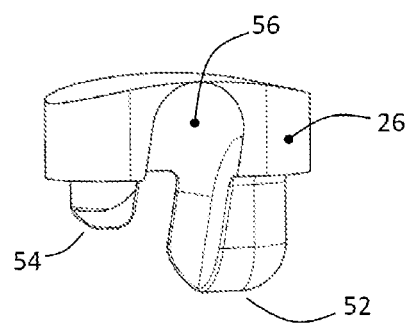
FIG. 3 shows a perspective illustration of a diverting insert.

FIG. 3 shows a perspective illustration of a diverting insert 26. Diverting inserts 26 of this type are inserted into the through-openings 22, 24 of the spindle nut 10. To remove the balls from the thread of the spindle or the spindle nut, said balls circulate in, for example, the receptacle 52, are transported radially outward and discharged via the transfer region 56 into the transfer channel of the spindle nut. The balls are discharged from the transfer channel in a reverse order, that is to say by entering the transfer region 56 from the transfer channel, transporting the balls into the receptacle 52 and discharging the balls into the thread of the spindle or spindle nut. The diverting inserts 26 are therefore mirror-symmetrical structural elements, which can be manufactured in particular as single-piece injection molded parts.

Figure 4:
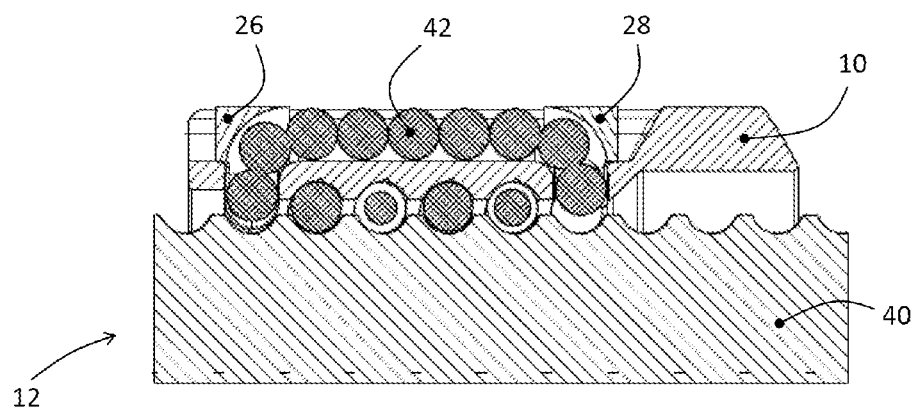
FIG. 4 shows a sectional view of a ball screw according to the invention.

FIG. 4 shows a sectional view of a ball screw 12 according to the invention. The recirculation raceway of the balls 42 in the ball screw 12 can be seen here. The spindle nut 10 is screwed onto a spindle 40. The diverting inserts 26, 28 are inserted into the spindle nut 10, and the balls 42 circulate in their raceway.

Figure 5:
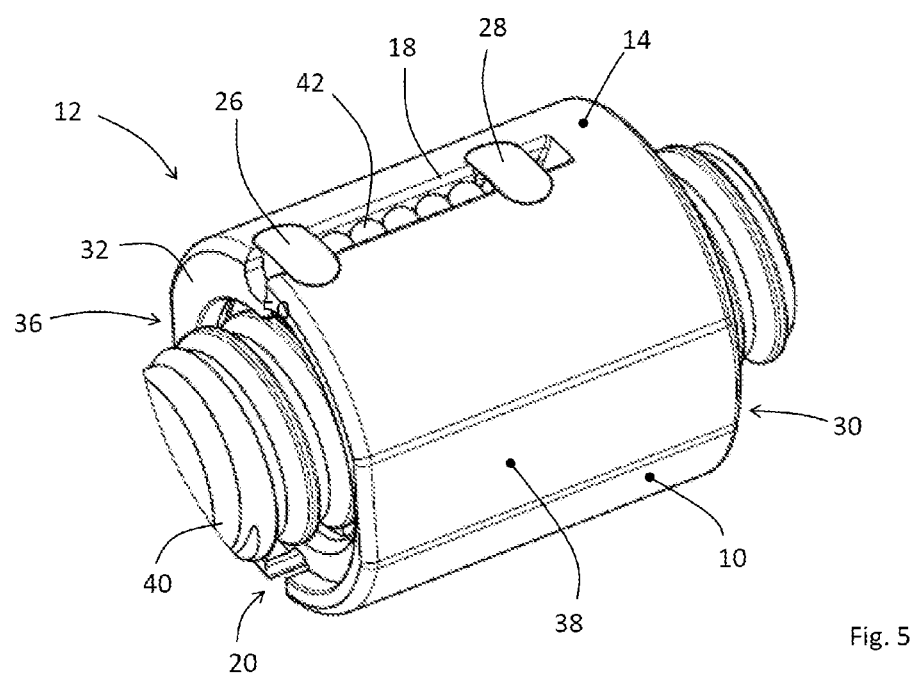
FIG. 5 shows a perspective illustration of a ball screw according to the invention.

FIG. 5 shows a perspective illustration of a ball screw 12 according to the invention. The ball screw 12 comprises a spindle 40, balls 42, diverting inserts 26, 28 and a spindle nut 10, the latter having the features explained in connection with FIG. 2. The ball screw 12 will generally also have one or more (transfer) channel coverings for completion purposes. These channel coverings ensure that the diverting inserts 26, 28 sit in the through-openings 22, 24 as far as possible without play and in particular do not fall out of the through-openings 22, 24.

Figure 6:
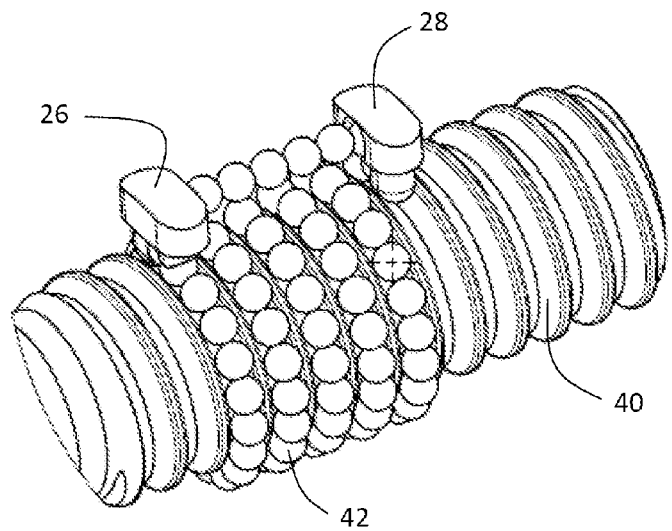
FIG. 6 shows a perspective illustration of a ball screw according to the invention with the spindle nut omitted.

FIG. 6 shows a perspective illustration of a ball screw 12 according to the invention with the spindle nut omitted. The arrangement illustrated here is theoretical in nature, since in practice it cannot be illustrated. This figure illustrates merely the raceway of the balls 42 in the spindle 40 and in the diverting inserts 26, 28, it being possible to see in particular the axially parallel raceway of the balls 42 between the diverting inserts 26, 28, which axially parallel raceway is formed by the transfer channels, which are not illustrated.

The spindle nut 10 according to the invention has been explained in connection with FIGS. 1 to 6 with reference to an exemplary embodiment, in which two transfer channels 18, 20, that is to say a pair of transfer channels, are provided. It is likewise possible to press in more than one pair of transfer channels. Furthermore, the invention has been explained with reference to an exemplary embodiment in which two diverting inserts 26, 28 are provided per transfer channel 18, 20. If the transfer channel is long enough, more than one such pair of diverting inserts can also be provided. A plurality of ball raceways per transfer channel is obtained in this way. In order to insert more than two diverting inserts 26, 28 into one transfer channel 18, 20, it is necessary to provide a corresponding number of through-openings.

Figure 7:
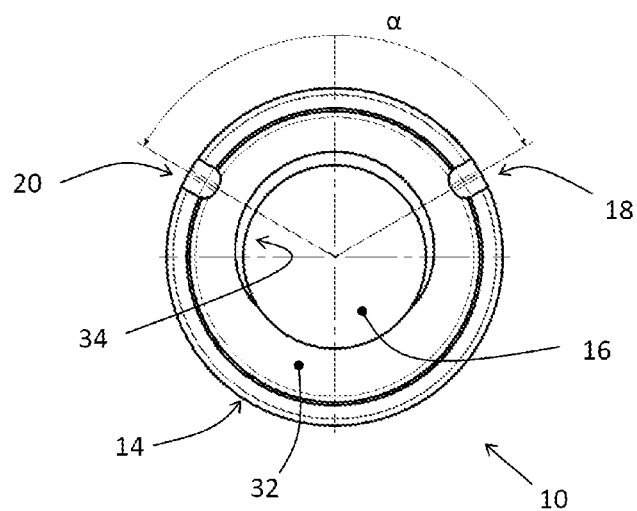
FIG. 7 shows a front view of a spindle nut according to the invention with the angular arrangement of two pressed-in channels.

FIG. 7 is the front view in the axial direction of the end face 32 of a spindle nut 10 according to the invention. The figure shows the central opening 16 with the internal thread 34 indicated. The pressed-in channels 18 and 20 (here configured with the same cross section) are arranged about an angle α=120° in the lateral surface 14 relative to the central longitudinal axis of the spindle nut 10. The arrangement shown is exemplary, the technically expedient angle range is between 100° and 180° (inclusive in each case). At α=180°, the channels 18 and 20 lie diametrally opposite one another.

Figure 8:
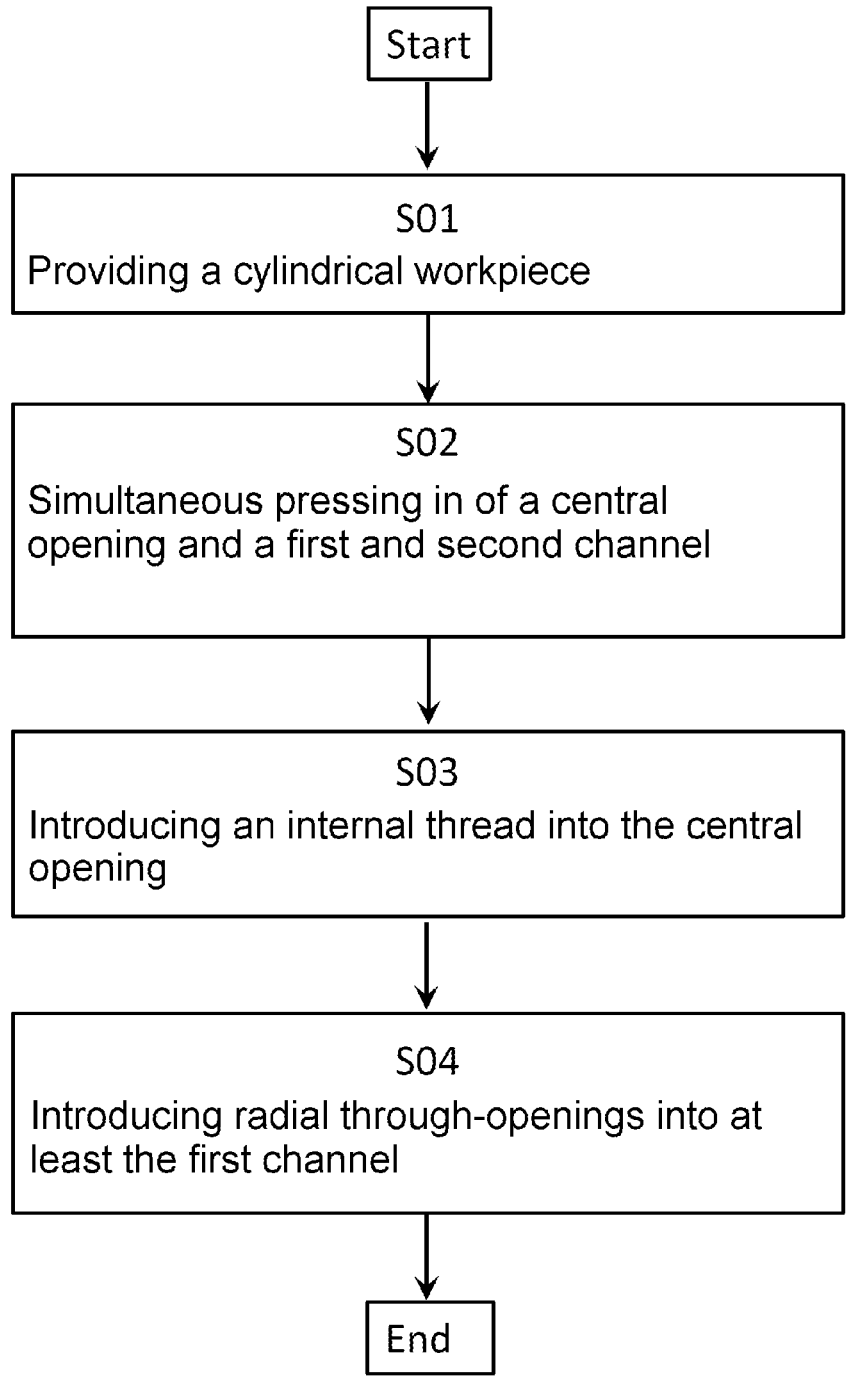
FIG. 8 shows a flow diagram of a method according to the invention.

FIG. 8 shows a flow diagram of a method according to the invention. The method begins in step S01 by providing a cylindrical workpiece, which has a first and a second end face and also a lateral surface. In step S02, the workpiece is shaped, in that a central opening and a pair of axially parallel channels are pressed into the lateral surface at the same time. The central opening and the channels are pressed into the workpiece here proceeding from a first end face. The transfer channels are thus always open toward the first end face. As a further process step S03, the internal thread is introduced into the central opening. After this, in step S04, a material-removing method step takes place. Radially running through-openings are introduced into at least the first channel.

The features of the invention disclosed in the preceding description, in the drawings and in the claims may be essential both individually and in any desired combination for implementing the invention.

The invention claimed is:

1. A method for producing a metallic spindle nut (10) for a ball screw (12), comprising the following steps:
   providing a substantially cylindrical workpiece (50) from metal, with a first end face (46) and a second end face (44) and also a lateral surface (14),
   shaping the workpiece (50) by pressing in an axially symmetrical central opening (16) and by simultaneously pressing in at least one first (18) and one second (20) channel which are oriented axially in parallel into the lateral surface (14) of the workpiece (50), the central opening (16) and the channels (18, 20) being open toward the first end face (46),
   introducing an internal thread (34) into the central opening (16), and
   forming at least the first channel (18) as a transfer channel by introducing at least two radially running through-openings (22, 24) into said channel (18) that are adapted for receiving diverting inserts (26, 28).

2. The method as claimed in claim 1, wherein the second channel (20), when not formed as a transfer channel, is produced with a pressing-in depth in a longitudinal direction and a volume of shaped material substantially corresponding to that of the first channel (18).

3. The method as claimed in claim 1, wherein the pressing in of the channels (18, 20) terminates before the second end face, such that the channels (18, 20) are closed toward the second end face (44).

4. The method as claimed in claim 1, wherein the through-openings (22, 24) are at least one of milled or bored.

5. The method as claimed in claim 1, wherein the central opening (16) is pressed in through to the second end face (44).

6. The method as claimed in claim 1, wherein the pressing in of the central opening (16) ends before reaching the second end face (44) and the method further comprises removing the second end face (44) by a material removal process after the pressing in operation, such that the central opening (16) is open toward a new second end face (30) produced thereby.

7. The method as claimed in claim 6, wherein the first end face (46) is removed by material removal after the shaping operation, resulting in a new first end face (32) being produced.

8. The method as claimed in claim 7, wherein the removal of the end faces (44, 46) by material removal is performed by turning.

9. The method as claimed in claim 1, further comprising forming axially parallel flattened portions (36, 38) into the lateral surface (14) during the shaping of the workpiece (50).

10. The method as claimed in claim 1, wherein the angular arrangement of the channels in the lateral surface is between 100° and 180° relative to a central longitudinal axis of the workpiece.

11. The method as claimed in claim 10, wherein the angular arrangement of the channels in the lateral surface is substantially 120° or 180° relative to the central longitudinal axis of the workpiece.

12. The method as claimed in claim 1, wherein the production steps "pressing in of the central opening" and "pressing in of a channel into the lateral surface" are carried out by cold forming.

13. A spindle nut (10) for a ball screw (12), produced by the method as claimed in claim 1, wherein the spindle nut (10) has in the lateral surface (14) at least one pair of axially parallel channels (18, 20), which are open toward the end face (32) of the spindle nut (10) and at least one of which comprises a transfer channel.

14. A ball screw (12), comprising:
a spindle nut (10) as claimed in claim 13,
a spindle (40),
a multiplicity of balls (42),
at least two diverting inserts (26, 28) in the at least one channel (18) formed as the transfer channel, and
at least one transfer channel covering.

\* \* \* \* \*